Figure 1:
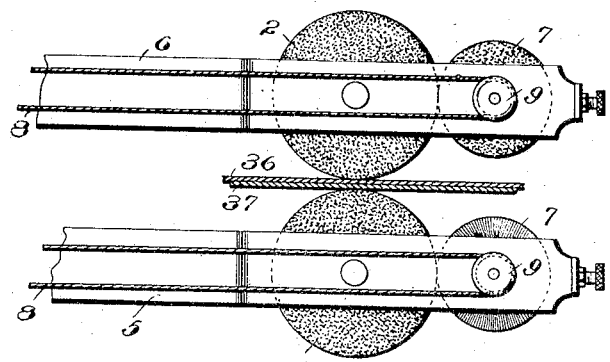

No. 837,296. PATENTED DEC. 4, 1906.
W. M. FULTON & J. S. BROWN.
ELECTRIC WELDING APPARATUS.
APPLICATION FILED JUNE 23, 1904.

2 SHEETS—SHEET 1.

Witnesses
H. B. Kirkam
Gustave R. Thompson

Inventors
John S. Brown and
Weston M. Fulton,
by
Mauro, Cameron, Lewis & Massie
Attorneys

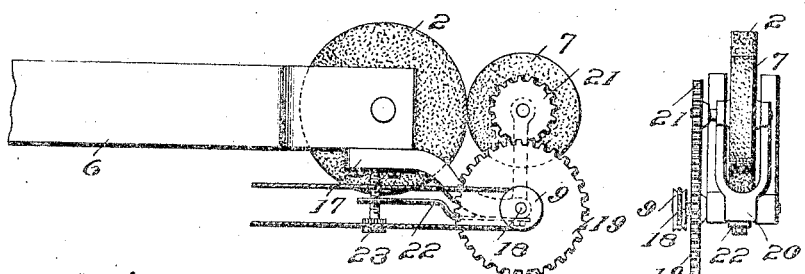
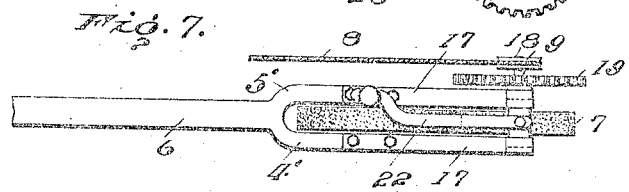
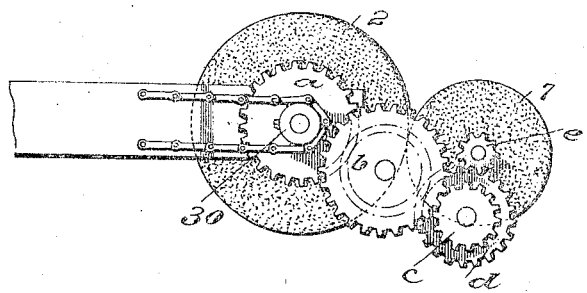
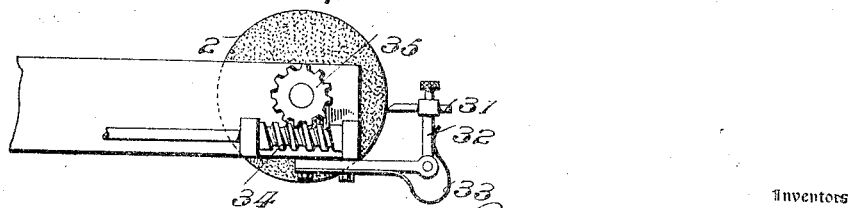

UNITED STATES PATENT OFFICE.

WESTON M. FULTON AND JOHN S. BROWN, OF KNOXVILLE, TENNESSEE, ASSIGNORS TO THE FULTON COMPANY, OF KNOXVILLE, TENNESSEE, A CORPORATION OF MAINE.

ELECTRIC WELDING APPARATUS.

No. 837,296.     Specification of Letters Patent.     Patented Dec. 4, 1906.

Application filed June 23, 1904. Serial No. 213,864.

*To all whom it may concern:*

Be it known that we, WESTON M. FULTON and JOHN S. BROWN, of Knoxville, Tennessee, have invented a new and useful Electric Welding Apparatus, which invention is fully set forth in the following specification.

This invention relates generally to a method of electric welding and apparatus for carrying out such method; but especially to electric welding of thin sheet metal.

In electrically welding sheet metal it is customary to lap the edges to be welded and pass them between two conducting-rolls, which constitute electrodes, and to heat the lapped edges by a current of high amperage and low voltage. In the application of this method to thin sheet metal serious difficulties have heretofore been experienced in maintaining a uniform heat at the point where the welding is being effected. This inability to properly control the heating effect at the junction of the thin metal hee produces irregular welding, even burning through the metal at some points, while at other points not enough heat is generated to cause the metal to weld. For these reasons electric welding has not been successfully applied to thin sheet metal. The irregular heating of the thin metal, we have discovered, is due to the varying resistance offered by the scale, which adheres tightly to the rolls, which latter constitute the electrodes through which the current passes.

As the metal is heated by the electric current and pressed together by the rolls there is formed a slight amount of scale, which adheres tightly to the surfaces of the rolls where they come into contact with the metal, and as this scale collects it forms a thin film or coating on the periphery of the rolls, which offers a relatively high resistance to the electric current. Furthermore, this coating is of uneven thickness, and its resistance to the flow of current accordingly varies as successive points on the periphery of the rolls come into contact with the metal to be welded. While these inequalities may not be of material consequence in welding thick metal, they are of utmost consequence in welding very thin metal, as will be apparent from a closer consideration of the two cases. Suppose, for example, it is proposed to weld together the overlapping edges of sheets of No. 36 B. & S. gage Bessemer steel. This steel is .005 inch in thickness, which would give a total thickness of .01 inch at the seams where the metal is lapped. Suppose that when the seams are first started through the rolls the resistance of the metal is .05 microhm and the resistance at the surfaces in contact is .15 microhm, making a total resistance between the rolls of 0.2 microhm. As the welding proceeds and the coating of scale accumulates upon the rolls, suppose the resistance at the surface of contact between the rolls and the metal to increase to .35 microhm, the resistance of the metal remaining .05 as at first. This would give a total resistance of 0.4 microhm between the rolls, just double the original total resistance. This would reduce the electric current fifty per cent., the voltage remaining constant. Next consider the case of thicker metal. Suppose, for example, that it is proposed to weld together the overlapping edges of sheets of No. 2 B. & S. gage Bessemer steel. This metal is about fifty times as thick as No. 36 gage metal, and consequently its resistance would be 2.5 microhm on the supposition that No. 36 is .05 microhm. Let the resistance at the surfaces of contact be .15 microhm at the beginning of the weld, as in the case of the thin metal. This would give a total resistance of 2.65 microhms between the rolls. Now let the metal be drawn between the rolls, as before, and suppose, as in the case of the thin metal, the coating of scale on the surface of the rolls increases the resistance on the surface of contact to .35 microhm, the resistance of the thick metal remaining 2.5 microhms. This would give a resistance of 2.85 microhms between the rolls, an increase of only about seven and one-half per cent. over the original total resistance. This would reduce the current only seven per cent., the voltage remaining constant. In other words, since the resistance offered to a given electric current by a thin piece of metal is less than that offered by a thicker piece of the same kind of metal, it is evident that any given variation in resistance if produced in each case by the same cause will produce a greater change in the electric current in the thin metal than in the thick. It is thus apparent from a mathematical standpoint that the thickness of the metal to be welded is an all-important factor in the present process of electric welding, and we have found this distinction a vital one in actual practice. Recalling that according to a well-known physical law the heat produced by electricity is directly proportional to the product of the resistance multiplied by the square of the current, it necessarily follows from what has been said above that there must be marked variations in the heat developed as the seam is drawn along between the rolls. In order, therefore, to effect the weld at all points along the seam, the voltage must be great enough to produce the requisite heat at the points of greatest resistance. Hence when points of least resistance are reached the heat becomes excessive. After a very slight film of scale has collected on the rolls this inequality in heat becomes so marked that holes are burned through the metal at some points, while at others it is not welded, thus rendering the process worthless for welding thin metal. Furthermore, this irregular heat softens the rolls in spots and very soon causes them to wear unevenly at the periphery and destroys uniform contact with the metal.

Our object is to overcome the difficulties above referred to, and thereby successfully electrically weld together all kinds of thin metal sheets, strips, or edges.

To that end our invention consists, broadly stated, in effecting and producing means for effecting an approximately uniform resistance to the electric current by continuously removing the scale from the surface of the electrodes and dressing or polishing said surfaces to evenness, so as to continuously preserve uniformity of contact with the metal to be welded. Broadly stated, the means employed for this purpose is an abrasion device preferably in the form of a driven roll acting against the moving surface of the electrode to constantly maintain the same in such condition as to afford uniform resistance to the current.

The inventive idea involved may receive various mechanical expressions, some of which are shown in the accompanying drawings, which are designed merely to assist in the description of the invention and not as defining the limits thereof.

Figure 2:
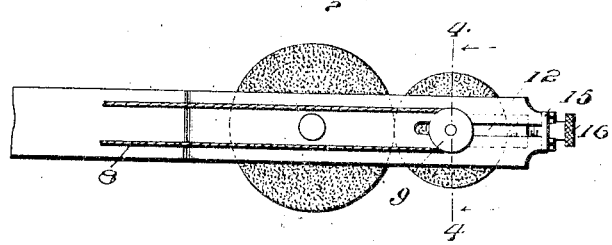
Figure 4:
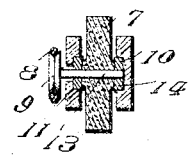
Figure 3:
Figure 5:
Figure 9:
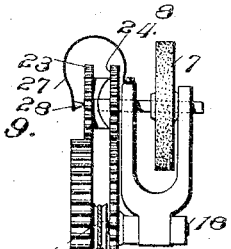
Figure 10:
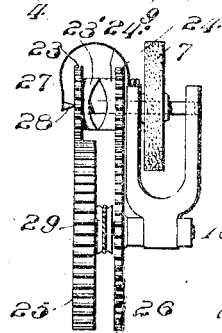

Figure 1 is an elevation. Figs. 2 and 3 are an elevation and a plan view showing a modification. Fig. 4 is a cross-section on the line 4 4 of Fig. 2. Fig. 5 is a detail of the adjustable cross-head. Fig. 6 is a side elevation, Fig. 7 a bottom view, and Fig. 8 an end view, illustrating a modification of the means for driving and adjusting the cleaning-roll. Figs. 9 and 10 show in elevation an end view of a further modification. Fig. 11 illustrates means for rotating the electrode and the cleaning-roll, and Fig. 12 shows a stationary cleaning-blade instead of a cleaning-roll.

Referring to Figs. 1, 2, 3, 4, and 5, electrodes 1 2 of suitable metal, such as copper, are revolubly supported in forks 3 4 of conducting-arms 5 6. In juxtaposition to the electrodes 1 2 we place suitable abrasion devices for removing the scale from the electrodes, which may be preferably supported in the same arms 3 4 as support the electrodes. Said devices are preferably in the form of dressing or polishing rolls or brushes 7, made of any approved material which will remove scale and act to true or dress the surface of the electrodes, such as carborundum wheels or stiff wire brushes. Rotary motion is imparted to rolls 7 7 by means of a cord and pulley 8 9. In order to adjust the polishing-rolls 7 7 to the electrodes as they become abraded, the prongs 3 4 are provided with slots 10 and 11, Fig. 4, cut in their ends, and prong 4 also has a slot 12, which forms an opening through which the spindle 13 of roll 7 projects. Roll 7 is mounted in a U-shaped cross-head 14, which slides in slots 10 and 11. An end piece 15 is bolted to the ends of prongs 4 5 and has passing through it a screw 16, which screws into the cross-head 14. The V-pulley 9 is fastened on the end of spindle 13, and a cable 8 drives the pulley from any convenient source of power. By means of screw 16 the pressure of polishing roll 7 upon welding-roll 2 is regulated. While the metal to be welded is passed under roll 2 roll 7 is driven at a high speed and dresses the surface of roll 2, keeping it bright and true.

Figs. 6, 7, and 8 illustrate a modified means for mounting and adjusting the polishing and cleaning roll 7. Two arms 17 are bolted to the prongs 4′ 5′ of conducting-arm 6. A rod 18 passes through their outer ends, and upon one end of this rod is mounted a small pulley 9, fastened on the face of a gear-wheel 19, free to turn on rod 18 as an axis. On rod 18 and between arms 17 is pivoted a pronged arm 20, which carries cleaning-roll 7. The small pinion 21 on one end of the spindle-shaft of roll 7 meshes with gear-wheel 19. A flexible bar 22 is bolted to the lower end of arm 20 and has a screw 23 passing through the opposite end, and the screw rests upon arm 17. By turning the screw the pressure of cleaning-roll 7 against welding-roll 2 is regulated. A cable 8 drives pulley 9, gear-wheel 19, pinion 21, and cleaning-roll 7.

It is sometimes desirable to have the cleaning-roll move back and forth across the face of the welding-roll in a direction parallel to the axis of the roll while it is being cleaned. This may be accomplished as indicated in Figs. 9 and 10. The pinions 23 and 24 have the same number of teeth, while the gear-wheel 25 has one more tooth than gear-wheel 26. Pinion 23 is fast on the end of the spindle-shaft of cleaning-roll 7, while pinion 24 is loose thereon. These pinions have eccentric lugs, as shown. A spring 27 carries a center point 28, which presses against the end of the spindle-shaft of cleaning-roll 7 and continuously tends to press the roll to the right, as seen in Figs. 9 and 10. Gear-wheels 25 and 26 and pulley 29 are fastened together and turn on the end of a rod 18, as explained in Figs. 6, 7, and 8. Gear-wheels 25 and 26 are driven by a cable which passes around pulley 29. Since wheel 25 has one more tooth than wheel 26, it is evident that for each complete revolution of these gear-wheels pinion 23 will turn farther than pinion 24 by one tooth. This causes the eccentric hubs 23' and 24' of these pinions to slide upon each other and alternately assume the positions indicated in Figs. 9 and 10, thereby carrying cleaning-roll 7 to the extreme right in Fig. 9 and to the extreme left in Fig. 10.

When it is desired to drive the welding-roll as well as the cleaning-roll, the arrangement shown in Fig. 11 may be employed. As here illustrated, the shaft of the welding-roll 2 is provided with a sprocket-wheel and communicates motion to the polishing-roll 7 through a train of gears $a\ b\ c\ d\ e$.

While we prefer to use a cleaning and dressing roll as the cleaning device for removing the scale and truing the surface of the electrodes, we do not limit ourselves to such means. It is within the scope of this invention to employ any suitable means to clean or dress the surface of the electrode which will effect the results specified and whether one of the electrodes is revoluble and the other stationary or whether both are revoluble. In Fig. 12 a stationary abrasion device is illustrated for removing the scale, and said means consists of a tool 31, suitably mounted in a tool-post 32, pressed by a spring 33, which holds the tool to its work. The roll may then be driven by a worm 34 and worm-gear 35.

In operation the thin sheet metal, such as No. 36 B. & S. gage Bessemer steel, is lapped at the edges, as indicated in Fig. 1 at 36 and 37, and inserted between the electrodes 1 and 2 and then heated to a welding temperature by the passage of a suitable current. While the metal is subjected to this operation the cleaning and polishing rolls 7 are rotated while pressed against the electrodes. The rolls are rotated at greater surface speed than the electrodes which are firmly pressed against the work. Fresh surfaces of the electrode are thus applied to the metal sheets and a uniform resistance secured at the contact of the two surfaces, thereby producing a uniform heating and effecting a perfectly-welded union.

What is claimed is—

1. In an electric welding apparatus, the combination of a revoluble electrode adapted to bear against the work and through which welding current passes to the latter, and means for maintaining the contact-surface of said electrode of approximately uniform conductivity.

2. In an electric welding apparatus, the combination of a revoluble electrode adapted to bear against the work and through which welding current passes to the latter, and means for removing scale from the contact-surface of said electrode during its operation.

3. In an electric welding apparatus, the combination of a revoluble electrode adapted to bear against the work and through which welding current passes to the latter, and means for dressing the contact-surface of said electrode during its operation.

4. In an electric welding apparatus, the combination of a revoluble electrode adapted to bear against the work and through which welding current passes to the latter, and means for continuously dressing the contact-surface of said electrode during its operation to maintain said contact-surface of approximately uniform conductivity.

5. In an electric welding apparatus, the combination of a revoluble electrode adapted to bear against the work and through which welding current passes to the latter, and an abrasion device acting upon the contact-surface of the electrode.

6. In an electric welding apparatus, the combination of a revoluble electrode adapted to bear against the work and through which welding current passes to the latter, and an abrasion device continuously acting upon the contact-surface of the electrode during its operation.

7. In an electric welding apparatus, the combination of a revoluble electrode adapted to bear against the work and through which welding current passes to the latter, a rotatable abrasion-roll bearing against the contact-surface of the electrode, and means for rotating said abrasion-roll at a different surface speed from that of the electrode.

8. In an electric welding apparatus, the combination of a revoluble electrode adapted to bear against the work and through which a welding current passes to the latter, means for dressing the contact-surface of said electrode during its operation, and means for adjusting the same to the electrode.

9. In an electric welding apparatus, the combination of a revoluble electrode adapted to bear against the work and through which a welding current passes to the latter, an abrasion-roll bearing against the contact-surface of the electrode, means for rotating the roll, and means for adjusting the same to the electrode.

10. In an electric welding apparatus, the combination of a revoluble electrode adapted to bear against the work and through which a welding current passes to the latter, an abrasion-roll bearing against the contact-surface of the electrode, means for rotating the roll, and automatic means for adjusting the same to the electrode.

11. In an electric welding apparatus, the combination of a revoluble electrode adapted to bear against the work and through which a welding current passes to the latter, an abrasion-roll, a resilient member normally holding the roll against the electrode, and means for rotating the roll while the latter bears against the electrode.

12. In an electric welding apparatus, the combination of a revoluble electrode adapted to bear against the work and through which a welding current passes to the latter, an abrasion-roll, a resilient member normally holding the roll against the electrode, means for adjusting the tension of said resilient member, and means for rotating the roll while the latter bears against the electrode.

In testimony whereof we have signed our names to this specification in the presence of two subscribing witnesses.

WESTON M. FULTON.
JOHN S. BROWN.

Witnesses:
W. C. HAZEN,
C. A. MORSE.